US007299491B2

(12) United States Patent
Shelest et al.

(10) Patent No.: US 7,299,491 B2
(45) Date of Patent: Nov. 20, 2007

(54) AUTHENTICATED DOMAIN NAME RESOLUTION

(75) Inventors: Art Shelest, Sammamish, WA (US); James M. Gilroy, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 849 days.

(21) Appl. No.: 10/427,458

(22) Filed: Apr. 30, 2003

(65) Prior Publication Data

US 2004/0250119 A1   Dec. 9, 2004

(51) Int. Cl.
H04L 9/32 (2006.01)
G06F 17/30 (2006.01)
(52) U.S. Cl. ............................................. 726/4; 726/26
(58) Field of Classification Search ................ 726/4
See application file for complete search history.

(56) References Cited

U.S. PATENT DOCUMENTS

| | | | | |
|---|---|---|---|---|
| 5,777,989 | A * | 7/1998 | McGarvey | 370/254 |
| 6,119,234 | A * | 9/2000 | Aziz et al. | 726/11 |
| 6,381,627 | B1 | 4/2002 | Kwan et al. | 709/201 |
| 6,411,966 | B1 | 6/2002 | Kwan et al. | 707/201 |
| 6,434,600 | B2 | 8/2002 | Waite et al. | 709/206 |
| 6,578,066 | B1 * | 6/2003 | Logan et al. | 718/105 |
| 6,728,767 | B1 * | 4/2004 | Day et al. | 709/223 |
| 6,907,525 | B2 * | 6/2005 | Pazi et al. | 713/170 |

OTHER PUBLICATIONS

Vixie, Paul; "DNS and Bind Security Issues"; Proceedings of the 5th Usenx Iunix Security Symposium; Jun. 5-7, 1995; p. 209-216.
Xunhau Wang; Yih Huang; Yvo Desmendt; and Rine, David; "Enabling Secure On-Line DNS Dynamic Update"; Computer Security Applications, 2000. ACSAC '00 16th Annual Conference; Dec. 11-15, 2000; p. 52-58.
Le, Van and Guyennet, Herve; "IPSEC and DNSSEC to Support Grid Application Security"; Proceedings of the 2nd IEEE/ACM International Symposium on Cluster Computing and the Grid ( CCGRID2002); May 21-24, 2002; p. 425-426.
Massey, Daniel; Lewis, Ed; Gudmundsson, Olafur; Mundy, Russ; and Mankin, Allison; "Public Key Validation for the DNS Security Extension"; Proceedings of the DARPA Information Survivablity Conference & Exposition II (DISCEX '01); Jun. 12-14, 2001; vol. 1; p. 227-238.

(Continued)

Primary Examiner—Kambiz Zand
Assistant Examiner—William S Powers
(74) Attorney, Agent, or Firm—Workman Nydegger (57) ABSTRACT

Methods, systems, and computer program products for resolving domain name system records based on client authentication. Basing domain name resolution on client authentication provides remote clients with the convenience of domain names, without sacrificing the security of keeping potentially sensitive domain names private. An authoritative name server receives requests for domain name resolution from clients. For requests without client authentication, the authoritative name server responds that the domain name cannot be found. This response identifies the authoritative name server to the client so that the client can submit subsequent requests with client authentication. For requests with client authentication, the authoritative name server responds with the corresponding domain name addresses. Client may communicate domain name resolution requests directly to the authoritative name server or indirection, through one or more intermediate domain name servers. Client authentication may occur over a secure connection with the authoritative name server.

53 Claims, 5 Drawing Sheets

OTHER PUBLICATIONS

Jim, Trevor; "SD3: A Trust Management System With Certified Evaluation"; Proceedings of the 2001 IEEE Symposium on Security and Privacy; May 14-16, 2001; p. 106-115.

Davidowicz, Diane and Vixie, Paul; "Securing the Domain Name System"; *Network Magazine*; Jan. 2000; vol. 15, No. 1; p. 92-94 and 96-97.

Eastlake, D. and Kaufman, C.; "Domain Name System Security Extensions"; <http://www.ietf.org/rfc/rfc2065.txt?number=2065>; visited Jul. 7, 2003; p. 1-41.

Eastlake, D., "Domain Name System Security Extensions"; <http://www.ietf.org/rfc/rfc2535.txt?number=2524>; visited Jul. 7, 2003; p. 1-47.

Mockapetris, P.; "Domain Names—Implementation and Specification"; <http://www.ietf.org/rfc/rfc1035.txt?number=1035>; visited Jul. 7, 2003; p. 1-55.

Mockapetris, P.; "Domain Names—Concepts and Facilities"; <http://www.ietf.org/rfc/rfc1034.txt?number=1034>; visited Jul. 7, 2003; p. 1-55.

Elz, R. and Bush, R.; "Clarifications to the DNS Specification"; <http://www.ietf.org/rfc/rfc2181.txt?number=2181>; visited Jul. 7, 2003; p. 1-15.

Baba, T.; "Requirements for Access Control in Domain Name Systems"; <http://www.ietf.org/internet-drafts/draft-baba-dnsext-acl-requts-00.txt>; visited Jul. 7, 2003; p. 1-6.

Lioy, Antonio; Maino, Fabio; Marian, Marius; and Mazzocchi, Daniele; "DNS Security"; Proceedings of the Terena Networking Conference; May 22-25, 2000; p. 1-13.

* cited by examiner

AUTHENTICATED DOMAIN NAME RESOLUTION

CROSS-REFERENCE TO RELATED APPLICATIONS

N/A

BACKGROUND OF THE INVENTION

1. The Field of the Invention

The present invention relates to domain name resolution. More particularly, the present invention relates to systems, computer program products, and methods for resolving domain names based on client authentication.

2. The Relevant Technology

Security is a growing concern for many organizations (including families and individuals) that offer outside connections to computers on their home or business network. At any given time, an organization may provide access to certain computers over various networks (such as a local or wide area network, the Internet, etc.). For example, the organization may have an externally accessible computer to manage email, web content, financial or marketing data, technical information, or other content. While these external connections provide the organization with some benefits, they also introduce security concerns.

When an organization opens up a network computer to external access, the organization risks the possibility that unwanted persons (e.g., hackers) will gain access to restricted portions of that computer. Thus, organizations strike a balance between the need to allow remote access to potentially sensitive information and the chance a hacker may break through the security. To mitigate these risks, organizations often employ a firewall and other expensive security measures to restrict external access to their computers.

For example, an organization may implement any of one or more higher level secure communication protocols, such as Secure Sockets Layer (SSL) and Transport Layer Security (TLS) for encrypting data that passes between computers. The organization also may (or alternatively) employ a virtual private network (VPN) that provides access to an organization's network in part by forbidding entry of data packets that are not encrypted properly. An organization may enhance security further through lower level communication protocols, such as Internet Protocol Security (IPsec).

Many communication protocols, including those identified above, may transmit data intended for a private network over a public (or wide area) network through a "tunneling" protocol. Tunneling masks the transmission of private data sent over a public network so that certain information is inaccessible to the public network. Accordingly, an organization may implement one or more of these protocols to secure access to their computers.

Network connectivity allows for access to files and for conducting a variety of transactions from remote locations. Those wanting to access an organization's computer typically do so using a relatively easily remembered domain name that corresponds to one or more Internet Protocol (IP) addresses (or, in some cases one or more arbitrary text strings). IP addresses are numbers ranging from 32-bits (older standard: e.g., written as a set of four 8-bit numbers separated by periods) to 128-bits (more recent standard: e.g., written as a set of sixteen 8-bit numbers). IP addresses ordinarily represent an address for a computer on a network.

IP addresses, however, tend to be difficult to remember, and may change, especially within a particular network, depending on how a network server configures addresses (e.g., allowing static addresses, or requiring dynamic address assignment). Thus, a computer's domain name (e.g., www.company.com) often is a more convenient way to reference a particular computer on a network. Domain names are also convenient since domain names can be reassigned to different, or even multiple IP addresses, and hence may remain constant in spite of fairly significant changes in network configuration.

Figure 1:
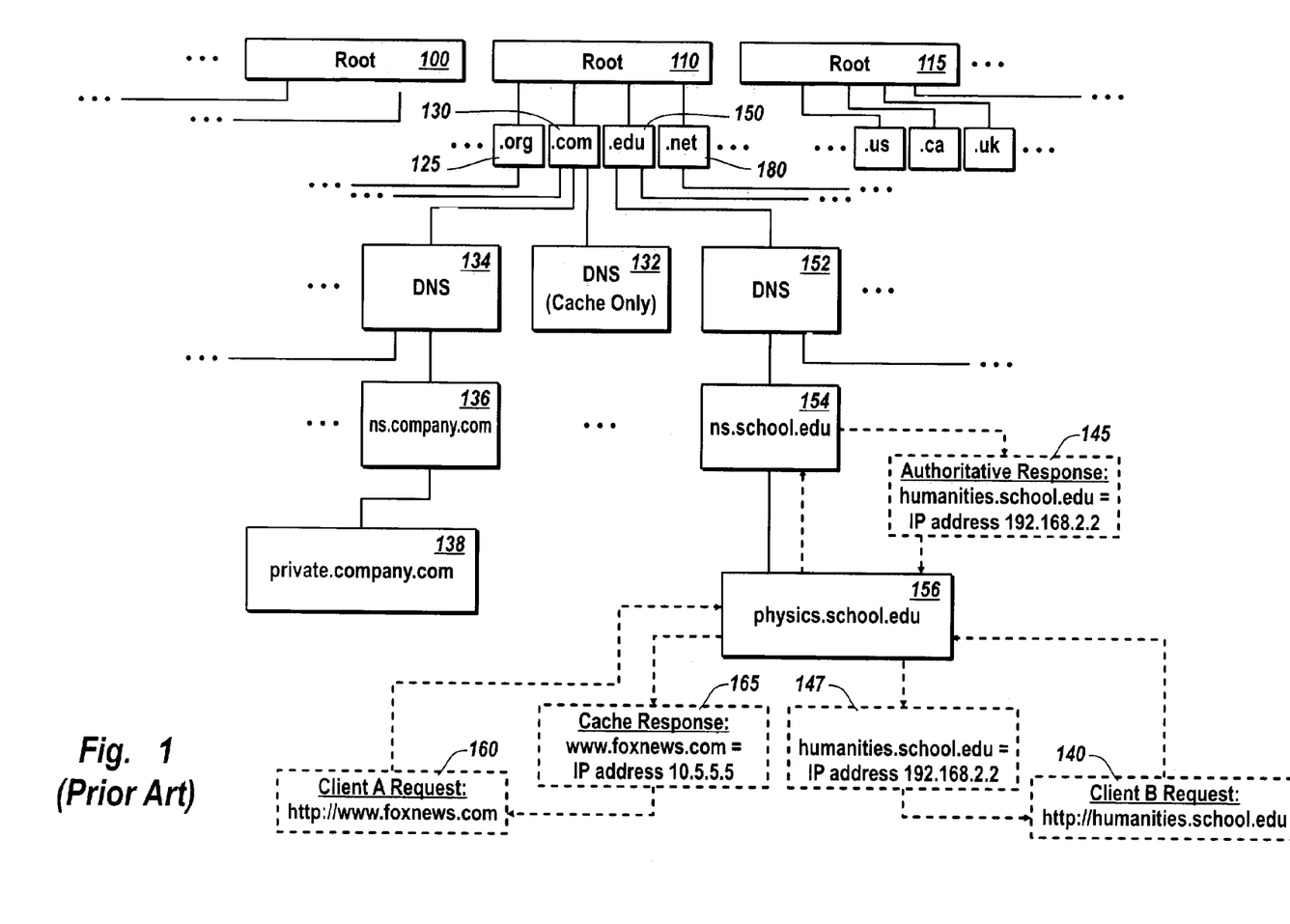
FIGS. 1 and 2 illustrate prior art domain name resolution in an example domain name hierarchy.

A domain name generally comprises a top-level domain (TLD), a second-level domain, and a server, protocol, and/or sub-domain. With reference to FIG. 1, "ns.company.com" 136 comprises three parts: ".com" represents the top-level domain 130, "company" represents a second-level domain with the ".com" TLD, and "ns" represents a server within the "company" second-level domain. The domain name, "ns.company.com" typically maps to, and can be thought of as, a readable version of an IP address. Frequently, the prefix letters "www" comprise a third level domain that represents a specific server for handling HyperText Transfer Protocol (HTTP) requests. Examples of sub-domains include prefixes preceding the second-level domain, such as in "private.company.com" 138 (or mail.company.com). In either case, a domain name server resolves domain names into domain name address for requesting clients.

Domain name servers (DNS servers, or name servers) are servers scattered over various worldwide zones, which can perform "name to address" translation—converting textual domain names into IP addresses and vice versa. To resolve a domain name, domain name servers refer to a distributed database of domain names and respective IP addresses. Requests for domain name resolution often are referred to as DNS queries. As described in more detail below, a domain name server may reference a cache containing recently accessed domain names with their corresponding IP addresses or may request the information from another domain name server.

The server responsible for maintaining domain name resolution information for a particular domain or sub-domain is known as an authoritative name server for the domain or sub-domain. Accordingly, a domain name server may function as an authoritative name server, a domain name cache server, or some combination of both. Except for relatively small domains or sub-domains, a single domain name server typically does not contain a complete reference of all domain names and corresponding IP addresses. Rather domain name servers usually are organized to coordinate and distribute available domain name information due to both performance and size considerations. The domain name server organization for the Internet follows a hierarchy beginning with several distributed root name servers, e.g., 100, 110, 115, etc., followed by various top-level domain name servers, e.g., ".org" 125, ".com" 130, ".edu" 150, ".net" 180, etc., and various more localized domain names servers, e.g., 134, 136, 132, 152, 154, etc.

An authoritative name server, such as name server 136, maintains domain name resolution information (domain names and corresponding IP addresses) for a portion of the hierarchy. For example, the authoritative name server "ns.company.com" 136 may be authoritative for various sub-domains in the "company" organization, such as, "private.company.com" 138, product.company.com (not shown), accounting.company.com (not shown), and mail.company.com (not shown). Similarly, other domain name servers in the ".com" or other hierarchies may be authoritative for a certain geographic area, such as Seattle, or for a particular range of IP addresses, such as the range of IP addresses assigned by an Internet Service Provider or registrar of domain names. Regardless, if a particular name server cannot determine the appropriate IP address for a given domain name, such as "private.company.com" 138, the name server may relay or forward the domain name request to other domain name servers, and eventually to the authoritative name server "ns.company.com" 136, if the information is not cached at intervening name servers.

By way of illustration, Client B requests 140 access to "http://humanities.school.edu" which requires the domain name "humanities.school.edu" to be resolved. The server "physics.school.edu" 156 caches some domain name resolution information, but in this example does not have the IP address for the "humanities.school.edu" domain name and therefore queries server 154. Name server "ns.school.edu" 154 is an authoritative name server for the "school.edu" domain and provides an authoritative response 145, indicating that "192.168.2.2" is the IP address for the "humanities.school.edu" domain name. This response may be forwarded 147 to client B. (It should be noted that throughout this document, an effort is made to use fictitious IP addresses which are reserved for local use.) Because name server "ns.school.edu" 154 is authoritative for the "school.edu" domain, "ns.school.edu" would not forward this request on to other DNS servers, but rather would respond that "humanities.school.edu" was unknown if no IP address were available. Upon receiving a response from "ns.school.edu" 154, server 156 "physics.school.edu" ordinarily caches the domain name and corresponding IP address for some period of time.

Request 160 from Client A for content at "http://www.foxnews.com" illustrates an example of cached domain name resolution information. In this case, server 156 previously has received domain name resolution information for "www.foxnews.com" and therefore can respond 165 with an IP address "10.5.5.5" and does not need to query other DNS servers. For frequently requested domain names, it is likely that a DNS server within the hierarch will have cached the domain name resolution information and it will not be necessary to access an authoritative server. It is possible to bypass any DNS caching, and query only the authoritative name server for the domain name resolution information, but due to performance considerations, bypassing the caching information is relatively uncommon.

Figure 2:
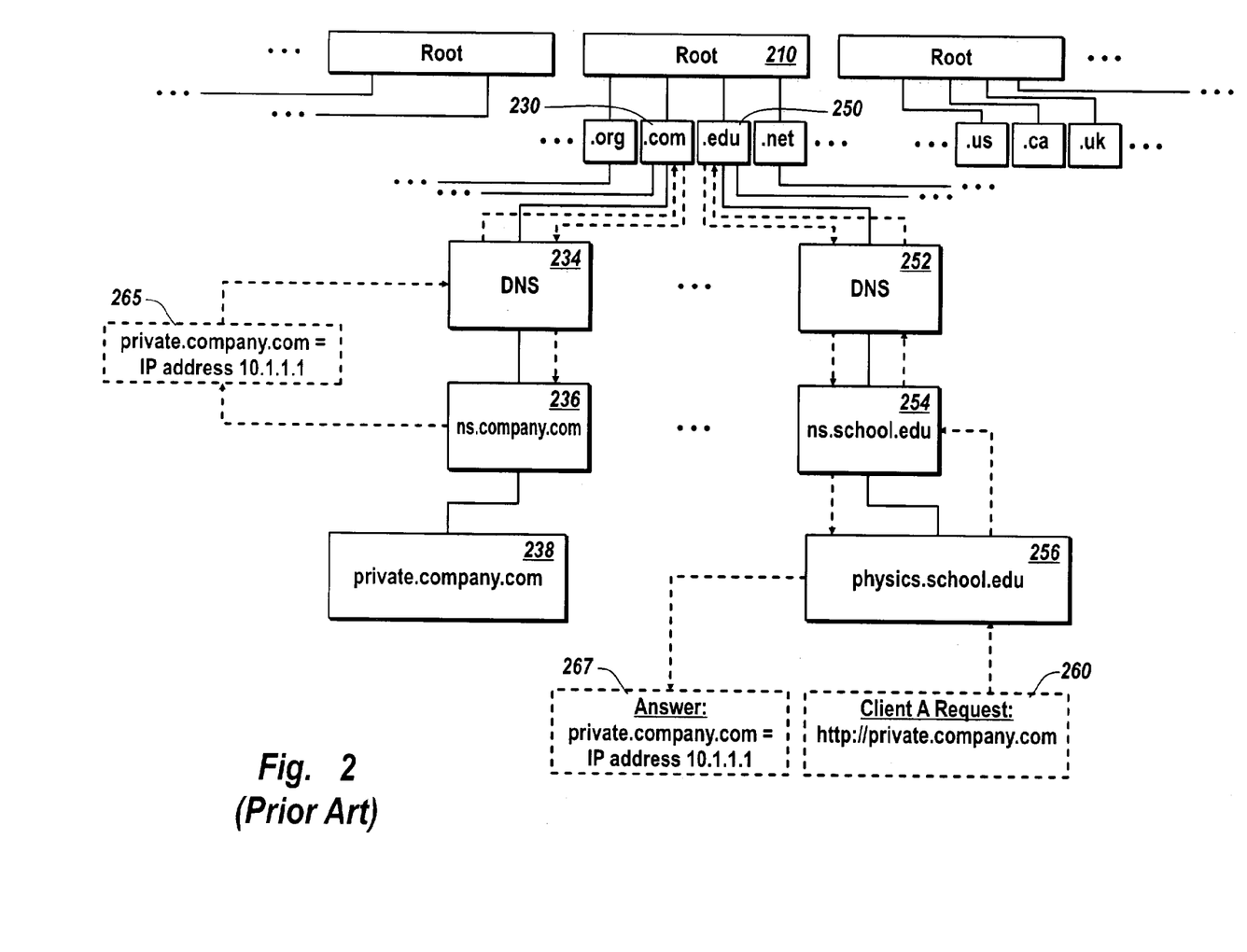

FIG. 2 shows how the process follows a slightly different path when a client requests a domain name that no name server in its hierarchy recognizes. For example, a client in the "school.edu" domain makes a request 260 for a domain name in the "company.com" domain. In this particular case, the request 260 is for resolution of the domain name "private.company.com" 238. For a variety of reasons, it is possible that none of the intermediary name servers 256, 254, 252, and 250 will recognize the requested domain name 260 from their cache.

Note that in FIG. 2, the example hierarchy does not show communication between the ".edu" DNS servers and the ".com" DNS servers. In practice, there is nothing to prevent one DNS server from communicating with another DNS server, provided the one server knows about the other. Accordingly, server 254 may be configured to query DNS server 234 for ".com" domain names, and so on. The particular hierarchy shown in FIG. 2, therefore, is only one example hierarchy that provides helpful context for describing the present invention, which is not restricted to any particular organization of DNS hierarchies.

For request 260, it is also possible that none of these intermediate name servers will recognize the authoritative name server 236 in their databases. In this case, the appropriate top-level name server ".edu" 250 or root name server 210 refers the request to a name server, e.g, 234, in the ".com" 230 hierarchy based on the top-level portion of the domain name "private.company.com" request. Alternatively, the top-level name server ".com" 250, root name server 210, or any other intermediate name server, may simply recognize that the name server "ns.company.com" 236 is authoritative for the "company.com" domain, and relay the request to the appropriate authoritative name server 236.

Typically, authoritative name servers, do not base their domain name resolution response on the client requesting the IP address. In some circumstances, communication between DNS servers may have a security component, but secure communication of DNS information is not ordinarily based on the requesting client. As a result, "ns.company.com" 236 is not able to shield the IP address of "private.company.com" from some clients, but make it available to others.

Nevertheless, for security reasons, an organization may not want DNS information available for certain servers. For example, "private.company.com" may operate as a gateway to a "company.com" private network or may be an internal server for "company.com" that may give hints to network topology, reveal project names, or otherwise disclose potentially sensitive information. If "ns.company.com" responds 265, the IP address "10.1.1.1" may be cached at various intermediate DNS servers, such as "physics.school.edu" 256, and become more widely known and accessible because "physics.school.edu" 256 and/or other intermediate domain name servers can then respond 267 with the IP address corresponding to "private.company.com" for requests from other clients. To guard against this security risk, many organizations prohibit domain name resolution for a server such as "private.company.com" and allow access only from within a private network or if a client knows the correct IP address.

As described above, however, IP addresses are difficult to remember and subject to change. Accordingly, prohibiting domain name resolution as a security measure represents a significant burden for clients. What is needed, therefore, is a way of allowing only authorized clients to resolve certain domain names and receive the corresponding IP address, so that clients can resolve and access only those domain names for which the clients are authorized.

BRIEF SUMMARY OF THE INVENTION

The present invention solves one or more of the foregoing problems by offering systems, methods, and computer program products for resolving a wide variety of DNS records, and particularly domain name resolution of certain domain names, based on client authentication. This provides authorized clients with the convenience of domain name resolution, while preserving security by keeping gateways to a private network confidential from unauthorized clients, such as those who may attempt to break through other security measures protecting the private network.

In an example embodiment, an authoritative name server receives a request for domain name resolution from a client computer. The request for domain name resolution may include client authentication, or, alternatively, the authoritative name server may receive the client authentication at a later point. In either case, if the authoritative name server recognizes the received client authentication as valid, the authoritative server sends to the client the IP address corresponding to the requested domain name. Prior to authentication, the authoritative server responds that the requested domain name is unknown.

The identity of the authoritative name server may be discovered by an iterative domain name query that bypasses DNS caching. Bypassing DNS caching assures that the query will eventually reach the authoritative name server for the requested domain name. When the client receives the response indicating that the domain name is unknown to the authoritative name server, the client may subsequently contact the authoritative name server and authenticate appropriately.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention extends to methods, systems, and computer program products for resolving a client-requested domain name so that the client can access only those domain names for which the client is authorized. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
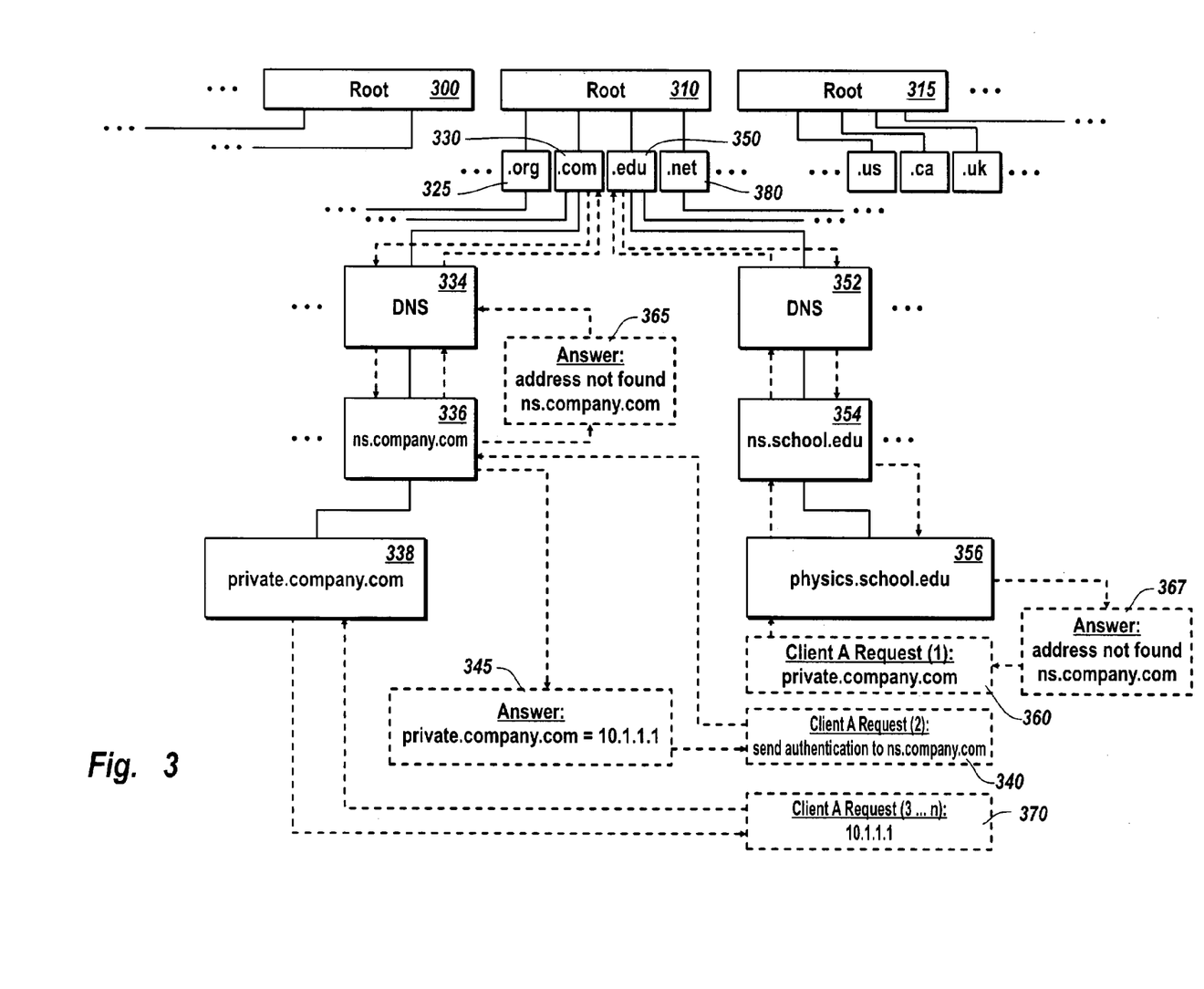
FIG. 3 illustrates a domain name resolution for an example domain name hierarchy in accordance with the present invention.

FIG. 3 illustrates an example embodiment of domain name resolution in accordance with the present invention. FIG. 3 shows several root name servers, such as root 300, root 310, and root 315, which may be geographically scattered over a number of worldwide zones. Each root server handles requests arising from one or more top-level domains. In FIG. 3, root 310 receives requests from top-level domains as ".org" 325, ".com" 330, ".edu" 350, and ".net" 380. Root server 310 can relay requests for ".com" domain names arising from the ".edu" hierarchy in the event that none of the intermediary ".edu" name servers (e.g., 356, 354, 352, etc.) were able to resolve the request. Other root servers such as root 315 may handle other top-level domain names such as ".us", ".ca" and ".uk" in a similar fashion. Of course, the hierarchy shown in FIG. 3 is only one example hierarchy.

In accordance with the present invention, Client A may request 360 domain name resolution for the domain name "private.company.com" 338, for which domain name resolution is restricted in order to promote security. For example, "private.company.com" 338 may operate as a gateway to a "company.com" private network or may be an internal server for "company.com" that may give hints to network topology, reveal project names, or otherwise disclose potentially sensitive information. Accordingly, domain name resolution information for "private.company.com" may be hidden from some (e.g., unauthorized) clients. But, as described below, making domain name resolution information for "private.company.com" accessible to other (e.g., authorized) clients, may allow for increased remote access options that do not rely on more traditional virtual private networks (VPNs).

Client A may make the request to resolve "private.company.com" 338, for example, by typing the domain name in a web browser, initiating software to establish a virtual private network connection, or in some other way. Once Client A sends the request, no intermediary domain name servers in the ".edu" hierarchy 356, 354, 352 are able to resolve the domain name "private.company.com" 338 to a corresponding IP address. Each name server, therefore, forwards the request 360 along to the next appropriate name server (e.g. server 356 forwards to server 354, then to 352, etc.).

Where none of the intermediate name servers recognizes an authoritative server for the request 360, the top-level ".edu" name server 350 may recognize that the request should be forwarded to a name server in the top-level domain ".com" 330 hierarchy, or if the ".edu" name server 350 cannot recognize that the request 360 belongs in the ".com" hierarchy, then the ".edu" name server 350 will forward the address to the root name server 310. The root name server 310 may then recognize that the request for "private.company.com" 338 should be forwarded to ".com" name server 330, and may even recognize the authoritative name server 336 for the request 360.

Thus, the root name server 310 may relay the request to an additional name server 330, 334, or may relay the request directly to the "ns.company.com" 336 authoritative name server. If the root name server 310 were unable to determine an appropriate hierarchy or authoritative name server for the request 360, the root name server 310 would relay a response back to the requesting client indicating that the domain name is unknown. This sort of processing may continue down the ".com" hierarchy until the request reaches the authoritative name server 336.

Once the authoritative name server 336 receives the domain name resolution request 360, the authoritative name server checks the request for client authentication. Client authentication may come in many forms. For example, client authentication may comprise a device address, a device name or identification, a user name, a user name and password, a password, a digital signature, a specialized encryption form, and so on. In this case, client request 360 contains no authentication. Upon recognizing no valid client authentication, the authoritative name server 336 replies 365 to the client, for example, that authoritative name server "ns.company.com" 336 could not find the requested IP address for "private.company.com" 338.

This reply 365 travels back through the ".com" and ".edu" hierarchy of name servers until the name server "physics.school.edu" 356 relays an answer 367 to Client A. If the domain name had been resolved, traveling back through the hierarchy of name servers along the relay chain allows each name server to cache the resolution information from authoritative name server 336. In this case, however, there is nothing to cache, since the reply 365 contains no domain name resolution information, which helps preserve the secrecy of this domain name.

When Client A receives the response 367 that the request 360 for resolving "private.company.com" cannot be processed, Client A learns the identity of the authoritative name server "ns.company.com" 336 for "private.company.com" 338. This allows Client A to request, using any of a variety of communication protocols, domain name resolution for "private.company.com" directly from the authoritative name server "ns.company.com" 336. The request may involve secure (e.g., Secure Sockets Layer (SSL), Transport Layer Security (TLS), Internet Protocol Security (IPsec), etc.) or insecure communication protocols. Client A may include authentication with the request, separate from the request, or may receive a request for authentication from "ns.company.com" 336.

Upon receiving valid client authentication 340, the authoritative name server "company.com" 336 may respond 345 directly to the requesting client 340 with domain name resolution information for "private.company.com" 338. By requiring client authentication, however, the authoritative name server prevents unauthorized clients from resolving the domain name and learning the IP address of "private.company.com" 338. Furthermore, since the authoritative name server 336 responds directly to the client, the authoritative name server prevents other domain name servers from caching the reply and resolving the domain name for other unauthorized clients indirectly. With a valid domain name address, subsequent requests (3 and on) 370 can be sent directly (i.e., without any intervening DNS servers) to "private.company.com" 338. It should be noted that the authoritative name server and/or "private.company.com" may operate in any of one or more capacities, including as a router, a firewall, a virtual private network gateway, a proxy server, a web server, a database server, a file server, an email server, etc.

By way of clarification, FIG. 3 shows that the authoritative name server 336 resolves the domain name "private.company.com" as the IP address 10.1.1.1. One should note, however, that 32-bit IP addresses beginning with 10.0.0.0. and ending with 10.255.255.255 (i.e., 10.1.1.1) are not typically valid IP address except in local or private networks. The IP address 10.1.1.1 is used merely out of convenience since it will not identify any present, generally requested domain name available over the Internet. Accordingly, one should appreciate that the authoritative name server 336 may reply with an appropriate IP address that may be valid outside of a local network, or that may be valid only inside a local network, depending on the location of the requesting client.

Figure 4:
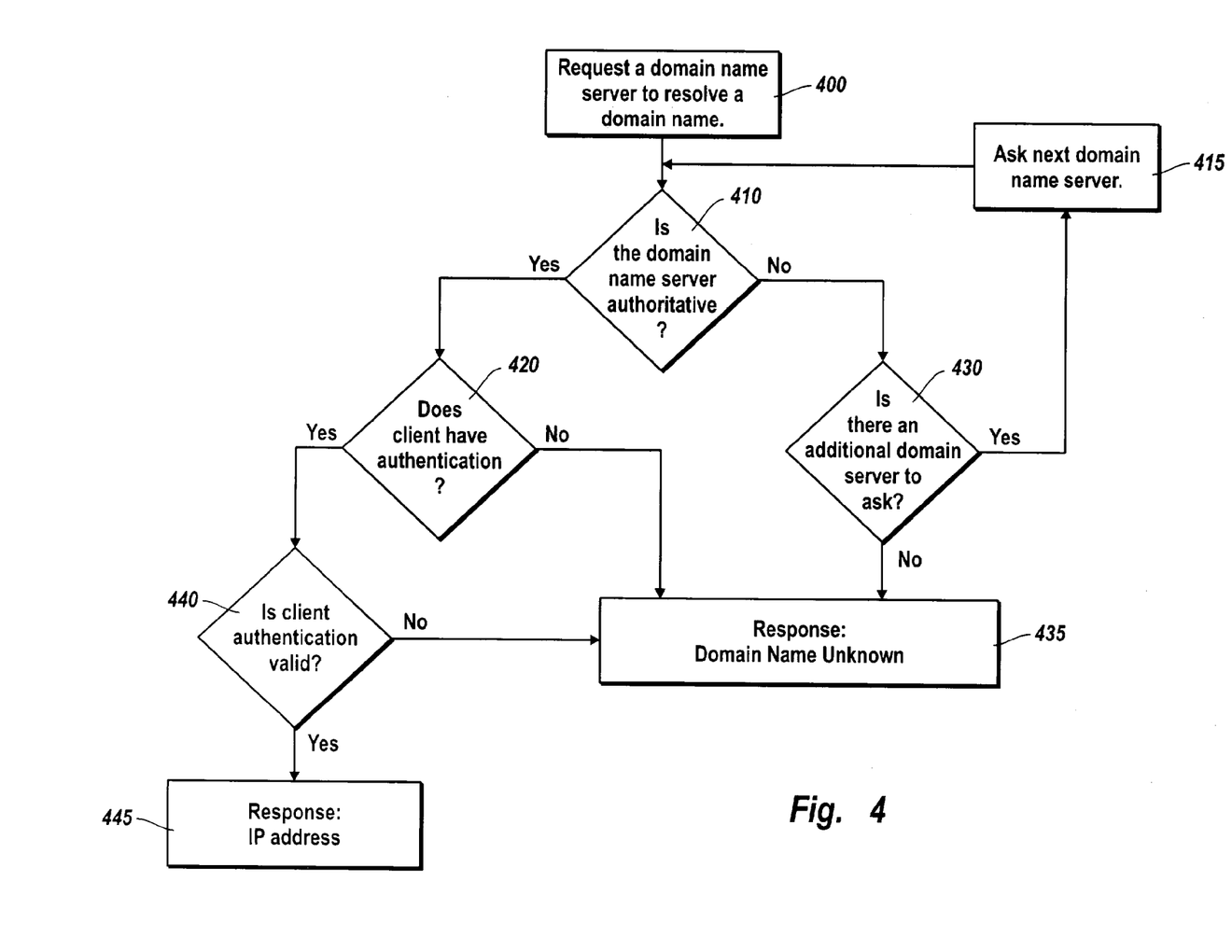
FIG. 4 illustrates a flowchart depicting an example embodiment of the present invention.

FIG. 4 illustrates a flow chart in accordance with an example embodiment of the present invention. The present invention also may be described in terms of methods comprising functional steps and/or non-functional acts. Usually, functional steps describe the invention in terms of results that are accomplished, whereas non-functional acts describe more specific actions for achieving a particular result. Although the functional steps and non functional acts may be described or claimed in a particular order, the present invention is not necessarily limited to any particular ordering or combination of acts and/or steps.

As shown, a client sends a request (400) to resolve a particular domain name to a domain name server. Typically, each domain name server receiving the request (often termed a DNS query) checks to see if the domain name resolution information is cached. If cached, the domain name server responds with the domain name resolution information, which then may be cached for a period of time at other domain name servers participating in the query. If the domain name resolution information is not cached, the request is forwarded to another domain name server in the hierarchy, unless the domain name server is authoritative for the requested domain name.

As described above, an authoritative name server is responsible for maintaining domain name resolution information for a particular domain. Accordingly, an authoritative name server ordinarily is the final domain name server to which a request is forwarded. If an authoritative server does not have resolution information for a domain, the resolution information generally does not exist. Therefore, when a resolution request reaches an authoritative name server and the authoritative name server cannot resolve the domain name into a corresponding domain name address, the authoritative name server responds that the domain name is unknown or cannot be found.

Clients may specify in the domain name resolution request to iterate through intermediate domain name servers until either a cache entry is found, or the authoritative name server is found. In accordance with the present invention, the client may not know which name server is authoritative for a domain name of interest. To maintain compatibility with traditional domain name servers, therefore, the client's request specifies that the domain name system should discover the name mapping through its iterative mechanism. Again, for compatibility reasons, this request may not include client authentication.

Each domain name server receiving the request determines (410) if it has a cached entry for the requested domain name. If not, the domain name server determines (430) if there is an additional domain name server to which the query should be forwarded. Where no additional domain name servers are available to ask, the domain name server responds (435) that the domain name is unknown. If an additional domain name server is available, then the next domain name server receives (415) the request.

When the request reaches an authoritative name server (yes branch of decision block 410), the authoritative name server checks (420) to see if the client has authenticated. A step for authenticating a client may include acts of requesting authentication from the client, establishing or allowing a direct connection (secure or insecure) with the client, receiving client authentication from a client, sending a response to the client that a domain name is unknown, and the like. If the client has not authenticated, the authoritative name server responds (435) that the domain name is unknown. Note, however, that the response that the domain name is unknown identifies the authoritative name server so that the client can discover the authoritative name server without initially knowing the authoritative name server.

Of course, the authoritative name server may act as a traditional domain name server as well. Accordingly, the authoritative name server may receive requests for domain names that can be resolved without client authentication and resolve these domain names as requested, whereas access to domain name resolution for other, restricted domain names may only occur with proper client authentication.

Therefore, a step for responding to one or more unauthenticated clients may include acts of determining that a client is not authorized to receive a domain name address corresponding to a requested domain name and sending a response to an unauthenticated client that the domain name is unknown. A step for responding to unauthenticated clients further may include an act of sending a response identifying a domain name address for a public domain name (i.e., one that is unrestricted and does not require client authentication) and sending the domain name to an unauthenticated client.

Requiring authentication for certain domain names allows for the convenience of domain name resolution (e.g., clients do not need to know domain name addresses, such as IP addresses, which can be difficult to remember and are subject to change) without necessarily making this information generally available (which is a significant security measure). As a result, domain names for servers internal to a private network can be kept confidential, except for those clients who properly authenticate. Often, such domain names convey information about a networks configuration, may identify of projects, or otherwise represent sensitive information that should not be available to unauthorized requestors.

Furthermore, basing domain name resolution on client authorization allows an authoritative name server to provide different or custom resolution responses to different clients. For example, requests from a client in one department of a business may receive one resolution response, whereas a client in another department receives a different resolution response. It should be appreciated that this resolution process applies easily to a wide variety of DNS records, and not just those relating to protecting a network computer's identity, such a domain name to address resolution.

The authoritative name server may request client authentication, or upon receiving the response that a requested domain name is unknown, the client may send authentication to the authoritative server. Because client authentication typically includes sensitive information, the client may establish a direct connection with the authoritative server using a secure communication protocol, such as SSL, TLS, IPsec, etc. Client authentication also may be included in the request.

If the authoritative name server determines (440) that the client authentication is not valid, the authoritative name server responds (435) that the domain name is unknown. The authoritative name server may respond that the client authentication is invalid, but this provides information about the authoritative server, which for some implementation may be undesirable. For example, disclosing that the authoritative name server expects credentials may make it the focus of an attack.

If the authoritative name server determines (440) that the client authentication is valid, the authoritative name server responds (445) with the domain name address for the requested domain name. Therefore, a step for responding to one or more authenticated clients may include acts of determining that a client is authorized to received a domain name address for a requested domain name and sending the domain name address to the authorized client.

With the domain name address, the client can establish a connection with the server of interest. Naturally, a variety of other security measures, such as those typically implemented for accessing any server, are likely to be in place and can coexist with the selective domain name resolution of the present invention. The server for the requested domain name and the authoritative name server may operate in a number of capacities, including as a router, a firewall, a virtual private network gateway, a proxy server, a web server, a database server, a file server, an email server, and the like.

The request to resolve a domain name described above involves a slight security risk—the domain name is identified in the request and therefore is accessible to eavesdroppers. As an added measure of protection, the actual domain name may be maintained in confidence by identifying the authoritative name server for the domain name prior to making a request to resolve the actual domain name. In one example embodiment, a request to resolve a non-existent domain name is used to identify the authoritative name server. Consider, for example, a request to resolve non-existent.company.com to its corresponding domain name address. When this query eventually reaches an authoritative name server, such as ns.company.com, the authoritative name server will respond that the domain name is unknown, but the response will identify ns.company.com as the authoritative name server.

Alternatively, the client may ask explicitly for the name server record for company.com, which should represent little or no security risk, using traditional resolution techniques, and then perform additional resolution over a secure connection. For example, in order to resolve a domain name, such as secrethost.secretdepartment.company.com, the client first asks for the name server record for company.com, which identifies ns1.company.com as a name server. The client then securely connects to ns1.company.com and requests the name server record for secretdepartment.company.com, which identifies ns2.company.com as a name server. Finally, the client requests resolution (e.g. the address record) of secrethost.secretdepartment.company.com from ns2.company.com over a secure connection.

Whether domain name resolution occurs over a secure connection or an insecure connection may be a configuration option at the client. In an example implementation, a client may be configured to request all, none, or a portion of its domain name resolution requests over a secure connection. For example, to enhance compatibility with traditional domain name resolution, the client may be configured to use secure domain name resolution for particular domains or sub-domains known to support the present invention. Domain name resolution for other (unspecified) domains uses an insecure form of communication. These examples should not be interpreted as excluding other configuration mechanisms for specifying secure domain name resolution.

It should be noted that name server records (i.e., domain name system records that identify name servers for a domain name) and address records (i.e., domain name system records that identify a domain name address for a particular domain name) represent examples of Domain Name System (DNS) records. As indicated above, however, the present invention is not necessarily limited to any particular type of DNS record.

Figure 5:
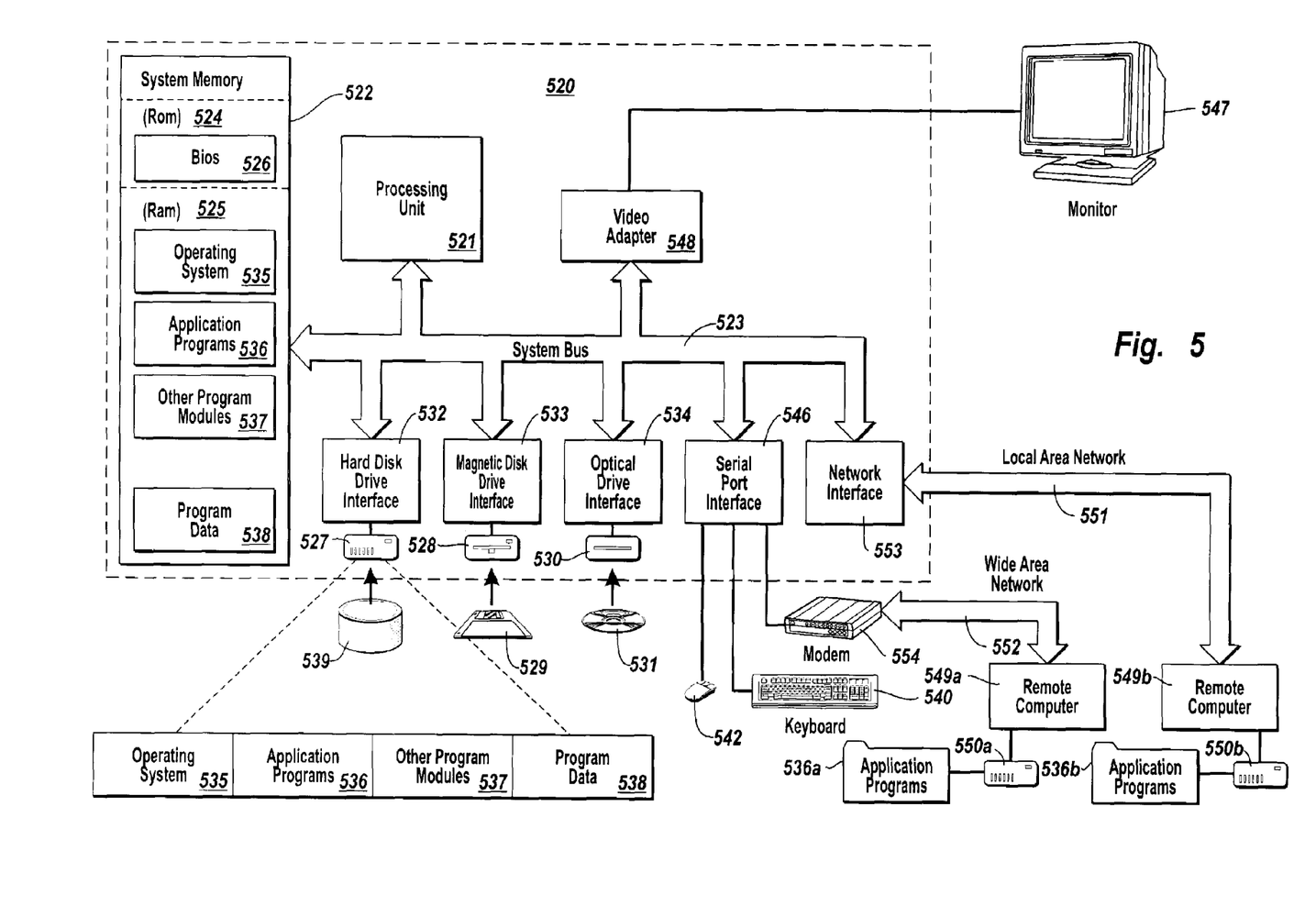
FIG. 5 illustrates an example system that provides a suitable operating environment for practicing the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general-purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disk 531 such as a CD ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

We claim:

1. In an authoritative name server configured to resolve one or more domain names, a method of selectively resolving a domain name so that a client requesting resolution of the domain name receives a domain name system response based on the client's authorization, the method comprising acts of:

at an authoritative name server, receiving, from a client, a first request to resolve a domain name into a corresponding domain name system response, the authoritative name server receiving the first request being capable of resolving the domain name into the corresponding domain name system response;

at the authoritative name server, sending, to the client, a first response identifying the authoritative name server sending the first response and indicating that the authoritative name server was unable to retrieve the requested domain name system response corresponding to the domain name;

at the authoritative name server, receiving, from the client, a subsequent request to resolve the domain name into a corresponding domain name system response, and the subsequent request having been sent by the client in response to the first response indicating that the authoritative name server was unable to retrieve the requested domain name system response;

at the authoritative name server, receiving client authentication from the client;

based on the received client authentication, determining at the authoritative name server that the client is authorized to receive the domain name response corresponding to the domain name; and sending the corresponding domain name system response to the client.

2. The method of claim 1, wherein a plurality of domain name system responses correspond to the first resolution request received from the client, the method further comprising an act of selecting the domain name system response sent to the client based on the received client authentication.

3. The method claim 1, wherein the authoritative name server receives client authentication over a secure connection with the client.

4. The method of claim 1, wherein the first request to resolve a domain name comprises a request to resolve at least one domain name into at least one domain name address, and wherein the corresponding domain name system response sent to the client comprises one or more domain name addresses corresponding to the at least one domain name.

5. The method of claim 4, wherein the first request to resolve the at least one domain name is received without client authentication.

6. The method of claim 5, wherein the first request is received from the client through an intermediate domain name server capable of resolving one or more other domain names into one or more other domain name addresses.

7. The method of claim 4, wherein the at least one domain name identifies at least one of router, a gateway, a firewall, or a proxy server for a private network.

8. The method of claim 4, wherein the at least one domain name identifies at least one of a web server, a database server, a file server, or an email server for a private network.

9. The method of claim 1, wherein the authoritative name server operates as one or more of a router, a firewall, a virtual private network gateway, a proxy server, a web server, a database server, a file server, or an email server.

10. A computer program product comprising one or more computer readable storage media having stored thereon computer executable instructions that, when executed on suitable computing equipment, implement a method of selectively resolving a domain name so that a client requesting resolution of the domain name receives a domain name system response based on the client's authorization, the method being that of claim 1.

11. The computer program product of claim 10, wherein the authoritative name server receives the subsequent request from the client through a direct connection.

12. The computer program product of claim 10, wherein the authoritative name server receives client authentication over a secure connection with the client.

13. The computer program product of claim 10, wherein the initial request to resolve the domain name is received without client authentication.

14. The computer program product of claim 13, wherein the initial request is received from the client through an intermediate domain name server capable of resolving one or more other domain names into one or more other domain name addresses.

15. The computer program product of claim 10, wherein the authoritative name server operates as one or more of a router, a firewall, a virtual private network gateway, a proxy server, a web server, a database server, a file server, or an email server.

16. The computer program product of claim 10, wherein the domain name identifies at least one of router, a gateway, a firewall, or a proxy server for a private network.

17. The computer program product of claim 10, wherein the domain name identifies at least one of a web server, a database server, a file server, or an email server for a private network.

18. The computer program product of claim 10, the method further comprising acts of:

at an authoritative name server, receiving, from another client, a request to resolve a public domain name into one or more corresponding domain name addresses, wherein the request fails to include client authentication for the other client;

identifying the corresponding one or more domain name addresses corresponding to the public domain name; and sending the corresponding one or more domain name addresses to the other client.

19. The computer program product of claim 18, wherein authoritative name server is not authoritative for the public domain name.

20. In an authoritative name server configured to resolve one or more domain name system records, a method of selectively resolving a domain name system record so that a client requesting resolution of the domain name system record receives a domain name system response based on the client's authorization, the method comprising acts of:

at an authoritative name server, receiving, from a client, a first request to resolve a domain name system record into a corresponding domain name system response, the authoritative name server receiving the first request being capable of resolving the domain name system record into the corresponding domain name system response, and the first request being received via a first communication path;

at the authoritative name server, sending, to the client, a first response identifying the authoritative name server sending the first response and indicating that the authoritative name server was unable to retrieve the requested domain name system response corresponding to the domain name system record;

at the authoritative name server, receiving, from the client, a second request to resolve the domain name system record into a corresponding domain name system response, the second request having been made via a second communication path, and the second request having been sent by the client in response to the first response indicating that the authoritative name server was unable to retrieve the requested domain name system response;

at the authoritative name server, receiving client authentication from the client;
based on the received client authentication, determining at the authoritative name server that the client is authorized to receive the domain name response corresponding to the domain name system record; and
sending the corresponding domain name system response to the client;
wherein the first communication path over which the authoritative name server receives the first request includes a path through one or more domain name cache servers, and wherein the second communication path bypasses the one or more domain name cache servers for a direct connection between the client and the authoritative name server.

21. In a client capable of establishing a connection with an authoritative name server that resolves at least one domain name into at least one domain name address, wherein the authoritative name server only resolves domain names into the corresponding domain name addresses for authorized clients, a method of requesting, from the authoritative name server, a domain name address that corresponds to a domain name, the method comprising acts of:
a client sending an initial request, to resolve a domain name into a corresponding domain name address, to an authoritative name server capable of resolving the domain name into the domain name address, the initial request being sent without client authentication;
the client receiving an initial response from the authoritative name server indicating that the domain name address is unknown to the authoritative name server;
determining, by the client, that client authentication is needed to receive the domain name address from the authoritative name server;
sending to the authoritative name server a subsequent request, the subsequent request including client authentication, to resolve the domain name into the corresponding domain name address; and
in response to having sent the subsequent request including client authentication, receiving the corresponding domain name address in a subsequent response sent from the authoritative name server.

22. The method of claim 21, wherein the subsequent request is sent through a secure connection.

23. The method of claim 21, wherein determining that client authentication is needed comprises an act of the client receiving a request for the client authentication from the authoritative name server.

24. The method of claim 21, wherein the client and the authoritative name server are connected to a common private network.

25. The method of claim 21, wherein the authoritative name server functions as a gateway computer on one or more of a home, or an organizational network.

26. The method of claim 25, wherein the gateway computer functions further as one or more of a router, a firewall, a virtual private network, a proxy server, a web server, a database server, a file server, or an email server.

27. The method of claim 21, wherein the domain name identifies at least one of a router, a firewall, a virtual private network gateway, a proxy server, a web server, a database server, a file server, or an email server for a private network.

28. A computer program product comprising one or more computer readable storage media having stored thereon computer executable instructions that, when executed on suitable computing equipment, implements a method of requesting, from an authoritative name server, a domain name address that corresponds to a domain name, the method being that of claim 21.

29. The computer program product of claim 28, wherein the subsequent request is sent through a secure connection.

30. The computer program product of claim 28, the method further comprising an act of the client receiving a request for the client authentication from the authoritative name server.

31. The computer program product of claim 28, wherein the client and the authoritative name server are connected to a common private network.

32. The computer program product of claim 28, wherein the authoritative name server functions as a gateway computer on one or more of a home, or an organizational network.

33. The computer program product of claim 32, wherein the gateway computer functions further as one or more of a router, a firewall, a virtual private network, a proxy server, a web server, a database server, a file server, or an email server.

34. The computer program product of claim 28, wherein the domain name identifies at least one of a router, a firewall, a virtual private network gateway, a proxy server, a web server, a database server, a file server, or an email server for a private network.

35. The method of claim 21, wherein determining that client authentication is needed to receive the domain address from the authoritative server comprises the client determining that the received initial response was from an authoritative name server capable of translating the domain name into the domain name address.

36. In a client capable of establishing a connection with an authoritative name server that resolves at least one domain name into at least one domain name address, wherein the authoritative name server only resolves domain names into the corresponding domain name addresses for authorized clients, a method of requesting, from the authoritative name server, a domain name address that corresponds to a domain name, the method comprising acts of:
a client sending an initial request, to resolve a domain name into a corresponding domain name address, to an authoritative name server capable of resolving the domain name into the domain name address, the initial request being sent without client authentication;
the client receiving an initial response from the authoritative name server indicating that the domain name address is unknown to the authoritative name server;
in response to receiving the initial response indicating that the domain name address is unknown to the authoritative name server, the client establishing a direct connection with the authoritative name server;
determining, by the client, that client authentication is needed to receive the domain name address from the authoritative name server;
sending, by the client, client authentication to the authoritative name server over the direct connection;
sending a subsequent request, to resolve the domain name into the corresponding domain name address, to the authoritative name server; and
in response to having sent client authentication, receiving the corresponding domain name address in a subsequent response sent from the authoritative name server;
wherein the initial request is directed through a domain name server to the authoritative name server because the authoritative name server is unknown, the domain name server identifying the authoritative name server and directing the initial request to the authoritative name server, the method further comprising an act of the client discovering the authoritative name server from the initial response from the authoritative name server indicating that the domain name address is unknown.

37. In an authoritative name server configured for resolving domain name addresses, a method for selectively resolving one or more client-requested domain names so that the client receives one or more corresponding domain name addresses only if the client is authorized, the method comprising steps for:

for one or more unauthenticated requests, originating from one or more unauthenticated clients, to resolve one or more domain names, an authoritative name server capable of resolving the one or more domain names into corresponding one or more domain name addresses responding to the one or more unauthenticated clients that the one or more domain name addresses are unknown because the one or more unauthenticated clients have not provided client authentication to the authoritative name server;

in response to the one or more unauthenticated requests originating from the one or more unauthenticated clients, receiving one or more subsequent requests over a direct connection with the one or more unauthenticated clients receiving, by the authoritative name server, client authentication such that the one or more subsequent requests are one or more authenticated requests; and for the one or more authenticated requests originating from one or more authenticated clients, to resolve the one or more domain names, the authoritative name server responding to the one or more authenticated clients with one or more domain name addresses corresponding to the one or more domain names because the one or more authenticated clients provided client authentication to the authoritative name server.

38. The method of claim 37, further comprising a step for authenticating the authenticated clients over a secure connection.

39. The method of claim 37, wherein the one or more unauthenticated clients and the one or more authenticated clients are the same one or more clients.

40. The method of claim 37, wherein the one or more unauthenticated requests are received from the one or more unauthenticated clients through one or more intermediate domain name servers capable of resolving a plurality of other domain names into a plurality of other domain name addresses.

41. The method of claim 37, wherein the one or more authenticated clients are external to a private network and the one or more domain names identify one or more servers internal to the private network.

42. The method of claim 41, wherein the one or more domain names identify at least one a web server, a database server, a file server, or an email server within the private network.

43. For a client capable of establishing a connection with an authoritative name server that resolves at least one domain name into at least one domain name address, wherein the authoritative name server only resolves domain names into the corresponding domain name addresses for authorized clients, a computer program product comprising one or more computer readable storage media having stored thereon computer executable instructions that implement a method of requesting, from the authoritative name server, a domain name address that corresponds to a domain name, the method comprising acts of:

a client sending an initial request, to resolve a domain name into a corresponding domain name address, to an authoritative name server capable of resolving the domain name into the domain name address, the initial request being sent without client authentication;

the client receiving an initial response from the authoritative name server indicating that the domain name address is unknown to the authoritative name server capable of resolving the domain name into the domain name address;

in response to receiving the initial response indicating that the domain name address is unknown to the authoritative name server, the client establishing a direct connection with the authoritative name server;

determining, by the client, that client authentication is needed to receive the domain name address from the authoritative name server;

sending, by the client, client authentication to the authoritative name server over the direct connection;

sending a subsequent request; to resolve the domain name into the corresponding domain name address, to the authoritative name server; and in response to having sent client authentication, receiving the corresponding domain name address in a subsequent response sent from the authoritative name server;

wherein the initial request is directed through a domain name server to the authoritative name server because the authoritative name server is unknown, the domain name server identifying the authoritative name server and directing the initial request to the authoritative name server, the method further comprising an act of the client discovering the authoritative name server from the initial response from the authoritative name server indicating that the domain name address is unknown.

44. In a client capable of establishing a connection with one or more name servers that resolve at least one domain name into at least one domain name address, wherein at least one name server resolves domain name system records based on client authentication, a method of requesting one or more domain name addresses for one or more domain names, the method comprising acts of:

identifying an authoritative name server for a domain of interest, wherein the authoritative name server for the domain of interest is identified to the client in a message from the authoritative name server which indicates that the authoritative name server could not find a domain address for the domain of interest;

in response to receiving the message indicating that the authoritative name server could not find the domain name address for the domain of interest, establishing a secure connection with the authoritative name server;

sending client authentication to the authoritative name server over the secure connection;

requesting, from the authoritative name server, one or more domain name addresses for one or more domain names; and based on the client authentication, receiving from the authoritative name server at least one domain name address for the one or more domain names.

45. The method of claim 44, wherein the client authentication is sent with the request.

46. The method of claim 44, wherein identifying the authoritative name server comprises an act of requesting a name server record for the domain of interest.

47. The method of claim 46, wherein the domain of interest comprises a sub-domain of a higher-level domain, the method further comprising an act of requesting the name server record for the domain of interest from a name server for the higher-level domain.

48. The method of claim 47, wherein the request to the name server for the higher-level domain occurs over a secure connection.

49. The method of claim 48, further comprising an act of requesting a name server record for the higher-level domain to identify the name server for the higher-level domain.

50. The method of claim 44, wherein identifying the authoritative name server comprises an act of requesting domain name resolution for a non-existent domain name.

51. The method of claim 44, wherein the client is configured to request the one or more domain name addresses for the one or more domain names using a secure form of communication.

52. The method of claim 51, wherein the client is configured to request one or more other domain name addresses for one or more other domain names using an insecure form of communication.

53. The method of claim 52, wherein the client configuration to use a secure form of communication or an insecure form of communication is domain specific.

* * * * *